United States Patent
Li et al.

(10) Patent No.: US 11,294,973 B2
(45) Date of Patent: Apr. 5, 2022

(54) CODELESS INFORMATION SERVICE FOR ABSTRACT RETRIEVAL OF DISPARATE DATA

(71) Applicant: Walmart Apollo, LLC, Bentonville, AR (US)

(72) Inventors: Ting Li, Pea Ridge, AR (US); Chris M. Johnson, Bella Vista, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 110 days.

(21) Appl. No.: 15/411,454

(22) Filed: Jan. 20, 2017

(65) Prior Publication Data

US 2017/0212959 A1    Jul. 27, 2017

Related U.S. Application Data

(60) Provisional application No. 62/281,474, filed on Jan. 21, 2016.

(51) Int. Cl.
*G06F 16/00* (2019.01)
*G06F 16/9535* (2019.01)
*G06F 16/25* (2019.01)

(52) U.S. Cl.
CPC ........ *G06F 16/9535* (2019.01); *G06F 16/256* (2019.01); *G06F 16/258* (2019.01)

(58) Field of Classification Search
CPC ......... G06F 17/30569; G06F 17/30867; G06F 16/256; G06F 16/258; G06F 16/9535
See application file for complete search history.

(56) References Cited

U.S. PATENT DOCUMENTS

| | | | |
|---|---|---|---|
| 6,675,591 B2 | 1/2004 | Singh et al. | |
| 6,769,124 B1 * | 7/2004 | Schoening | G06F 9/4493 719/316 |
| 6,981,385 B2 | 1/2006 | Arshansky et al. | |
| 7,085,803 B1 * | 8/2006 | Shisler | H04L 29/06 707/999.01 |
| 7,143,078 B2 * | 11/2006 | Doherty | H04L 67/02 |
| 7,357,000 B2 | 4/2008 | Schwichtenberg et al. | |

(Continued)

OTHER PUBLICATIONS

Brimhall et al., *Stored Procedures*, Chapter 17, 2 pages, 2012.

(Continued)

*Primary Examiner* — Shew Fen Lin
(74) *Attorney, Agent, or Firm* — Patterson Thuente Pedersen, P.A.

(57) ABSTRACT

An abstraction engine receives requests identifying a source application and a logical identifier and maps the request attributes to a stored procedure. The stored procedure invokes a native database call with respect to a database and returns the response to the abstraction later, which reformats the response to an object having <key, value> pairs that is independent of the database protocol or organization. Stored procedures may be mapped to various combinations of attributes of requests, which may include attributes such as a user identifier and application version. The stored procedure may return data from a particular database location or perform more complex functions such as filtering functions with using predefined filter criteria and locations or a filtering criteria and/or location derived from the request.

16 Claims, 4 Drawing Sheets

(56) References Cited

U.S. PATENT DOCUMENTS

| | | | |
|---|---|---|---|
| 7,680,752 | B1 | 3/2010 | Clune, III et al. |
| 7,721,259 | B2 | 5/2010 | Heinke et al. |
| 7,797,339 | B2 | 9/2010 | Chase |
| 8,447,774 | B1 | 5/2013 | Robie |
| 8,648,706 | B2 | 2/2014 | Ranjan et al. |
| 8,694,880 | B2 | 4/2014 | Krasner et al. |
| 8,725,298 | B2 | 5/2014 | Wallaert |
| 8,890,675 | B2 | 11/2014 | Ranjan et al. |
| 8,892,601 | B2 * | 11/2014 | Greenberg ............... G06F 9/44 707/785 |
| 9,092,958 | B2 | 7/2015 | Brueggen et al. |
| 9,304,827 | B2 | 4/2016 | Werth et al. |
| 2002/0016814 | A1* | 2/2002 | Convent ............... G06F 9/465 709/203 |
| 2002/0049608 | A1 | 4/2002 | Hartsell et al. |
| 2002/0133805 | A1* | 9/2002 | Pugh .................... G06F 21/10 717/120 |
| 2004/0039748 | A1 | 2/2004 | Jordan |
| 2004/0243598 | A1 | 12/2004 | Sleeper |
| 2005/0083957 | A1 | 4/2005 | Ilnicki et al. |
| 2005/0246717 | A1* | 11/2005 | Poole ................... G06F 9/4484 719/316 |
| 2006/0075398 | A1* | 4/2006 | Bennett ................ G06F 9/5055 717/170 |
| 2006/0195476 | A1* | 8/2006 | Nori ...................... G06F 16/289 |
| 2007/0276834 | A1* | 11/2007 | Chase .................. G06F 17/3089 |
| 2008/0016086 | A1* | 1/2008 | Chang .................. G06F 16/248 |
| 2008/0301154 | A1* | 12/2008 | Vithayathil ............ G06F 16/20 |
| 2009/0055825 | A1 | 2/2009 | Smith et al. |
| 2009/0327331 | A1 | 12/2009 | Mathew et al. |
| 2010/0042868 | A1* | 2/2010 | Apelbaum ........... G06F 11/1482 714/2 |
| 2011/0066752 | A1 | 3/2011 | Lippincott et al. |
| 2012/0124550 | A1 | 5/2012 | Nocera et al. |
| 2012/0330703 | A1 | 12/2012 | Hohmann et al. |
| 2014/0019977 | A1 | 1/2014 | Kakade et al. |
| 2015/0088866 | A1* | 3/2015 | Shakespeare ......... G06F 16/252 707/722 |
| 2015/0229557 | A1 | 8/2015 | Kim et al. |
| 2015/0310076 | A1* | 10/2015 | Rambo ............... G06F 16/2379 707/602 |
| 2015/0310195 | A1 | 10/2015 | Bailor et al. |
| 2016/0350107 | A1* | 12/2016 | Bragg, Jr .................. G06F 8/71 |
| 2017/0097970 | A1* | 4/2017 | Bendel ................. G06F 16/252 |
| 2017/0111210 | A1 | 4/2017 | Chakrobartty et al. |
| 2017/0212959 | A1 | 7/2017 | Li et al. |
| 2017/0322806 | A1 | 11/2017 | Malur et al. |

OTHER PUBLICATIONS

Microsoft, *Chapter 8: Data Layer Guidelines,* 15 pages, accessed Aug. 1, 2016.

India, Peter, *Java Database Connectivity,* 4 pages, accessed Aug. 1, 2016.

Simion, et al. "Slingshot: A modular framework for designing data processing systems", Department of Computer Science, University of Toronto, 33 pages.

Agrawal, Sumeet. "Top Three Reasons Why We Love Informatica Big Data Management", Dec. 22, 2015, retrieved from http://blogs.informatica.com/2015/12/22/topthreereasonsloveinformaticabigdatamanagement/#fbid=IzuQesmdDCo. Retrieved on Feb. 4, 2016, 12 pages.

Cyole, Tim, Controller Setup for Alarm Monitoring: Best Practices, EMERSON Climate Technologies, Apr. 23-25, 2012, 20 pages.

Honeywell, Networked Control Monitoring & Alarm System, 2002, 4 pages.

Pacific Controls, Cold Storage and Refrigeration, Dec. 8, 2015, 3 pages.

* cited by examiner

CODELESS INFORMATION SERVICE FOR ABSTRACT RETRIEVAL OF DISPARATE DATA

RELATED APPLICATION

The present application claims the benefit of U.S. Provisional Application No. 62/281,474 filed Jan. 21, 2016, which is hereby incorporated herein in its entirety by reference.

TECHNICAL FIELD

This disclosure relates to systems and methods for accessing a database.

BACKGROUND

For a large enterprise, data may be stored in various locations and any various formats, i.e. different database protocols. Accordingly, applications must format requests according to various protocols and extract data from responses having various formats. This increases the cost of application development.

The systems and methods disclosed herein provide an improved approach for accessing databases using applications.

BRIEF DESCRIPTION OF THE DRAWINGS

In order that the advantages of the disclosure will be readily understood, a more particular description will be rendered by reference to specific embodiments illustrated in the appended drawings. Understanding that these drawings depict only typical embodiments and are not therefore to be considered limiting of the scope of the claims, the disclosure will be set out and explained with additional specificity and detail through use of the accompanying drawings, in which:

DETAILED DESCRIPTION

Figure 1:
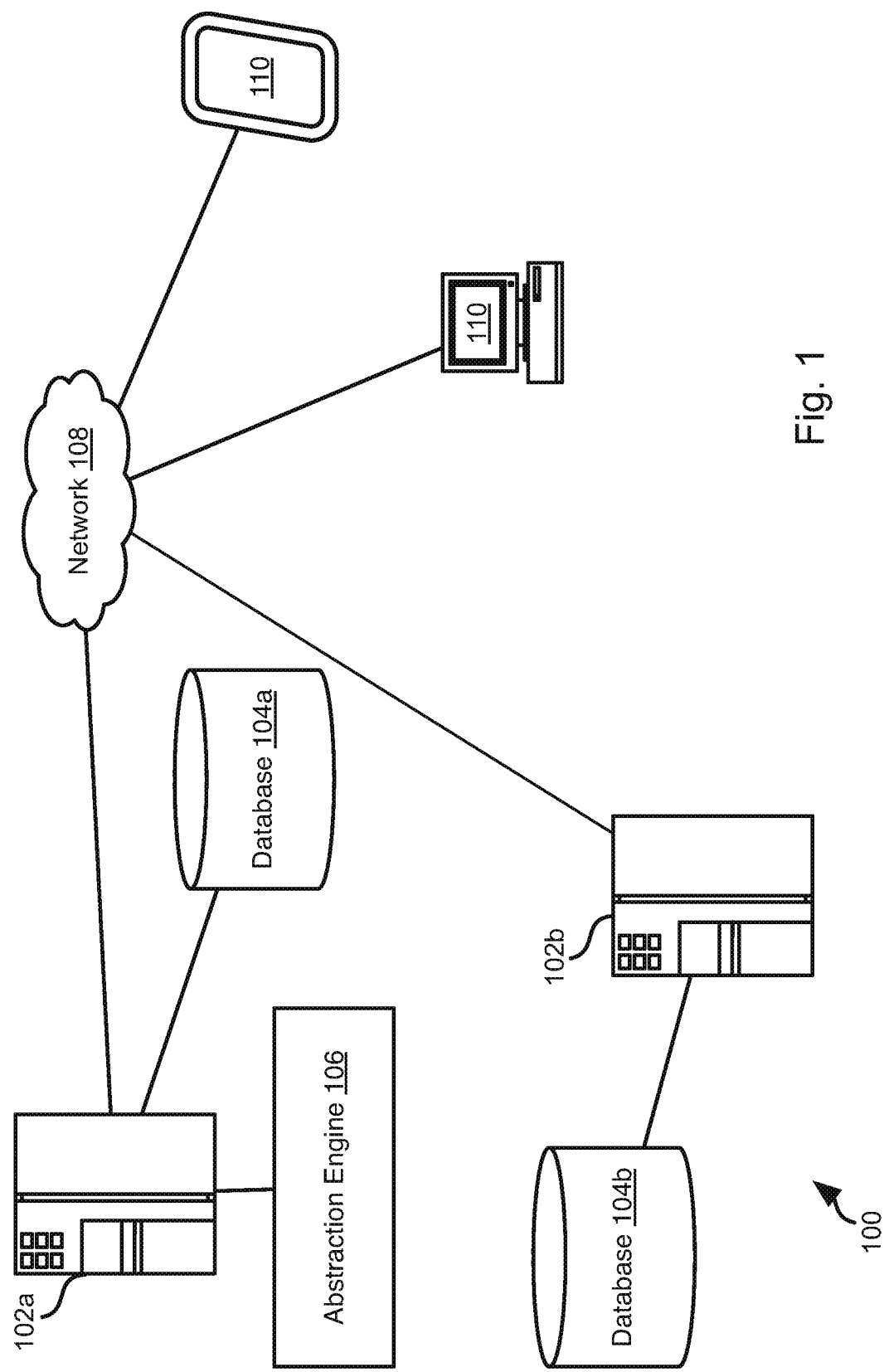
FIG. 1 is a schematic block diagram of a network environment suitable for implementing embodiments.

It will be readily understood that components of embodiments, as generally described and illustrated in the Figures herein, could be arranged and designed in a wide variety of different configurations. Thus, the following more detailed description of the embodiments of the disclosure, as represented in the Figures, is not intended to limit the scope of the claims but is merely representative of certain examples of presently contemplated embodiments in accordance with that which is claimed. The presently described embodiments will be best understood by reference to the drawings, wherein like parts are designated by like numerals throughout.

Embodiments in accordance with the present disclosure may be embodied as an apparatus, method, or computer program product. Accordingly, the present disclosure may take the form of an entirely hardware embodiment, an entirely software embodiment (including firmware, resident software, micro-code, etc.), or an embodiment combining software and hardware aspects that may all generally be referred to herein as a "module" or "system." Furthermore, the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present disclosure may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, a network environment 100 may be used to implement methods as described herein. The environment 100 may include a server system 102a associated with an entity. The server system 102a may host or access one or more databases 104a. The server system 102a may execute an abstraction engine 106 programmed to access the database 104a according to the methods described herein.

The server system 102a may further be in data communication with another server system 102b that may host or access another database 104b. For example, the server system 102a may be coupled to the server system 102b by means of a network 108, such as a local area network (LAN), wide area network (WAN), the Internet, or any other type of wired or wireless network connection. The abstraction engine 106 may access the database 104b by way of the network 108 and the server system 102b.

Users may access the server system 102a by way of personal computers 110, such as laptop or desktop computers, tablet computers, smartphones, or other types of computing devices. The personal computers may connect to the server system 102a by way of the network 108. In some embodiments, the server system 102a operates a web server for receiving and responding to requests from browsers executing on the personal computers 110.

Figure 2:
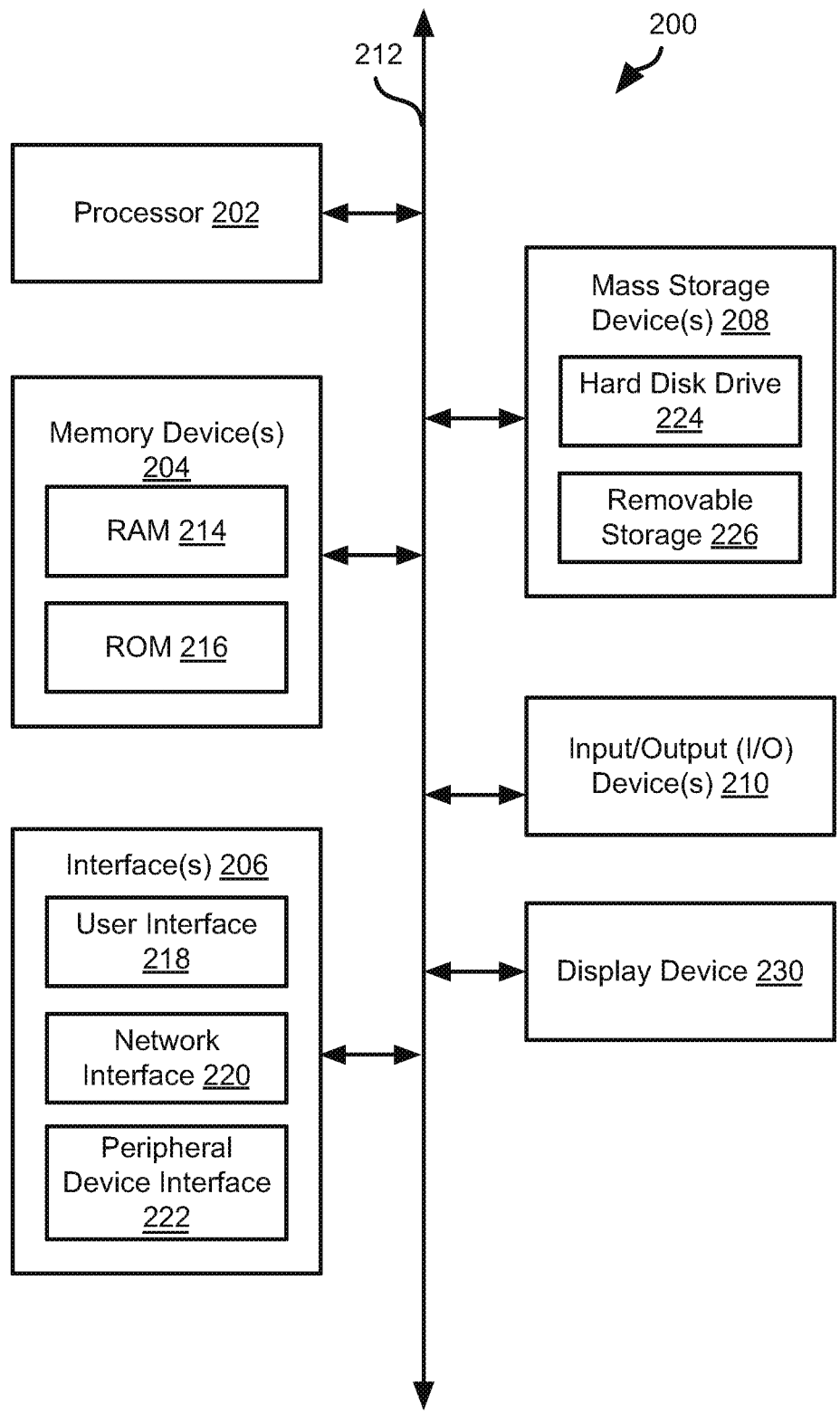
FIG. 2 is a schematic block diagram of an example computing device suitable for implementing methods in accordance with embodiments.

FIG. 2 is a block diagram illustrating an example computing device 200. Computing device 200 may be used to perform various procedures, such as those discussed herein. The server systems 102a, 102b and personal computers 110 may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, a tablet computer and the like. A server system 102a, 102b may include one or more computing devices 200 each including one or more processors.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WAN), wireless networks, and the Internet. Other interface(s) include user interface 218 and peripheral device interface 222. The interfaces) 206 may also include one or more peripheral interfaces such as interfaces for printers, pointing devices (mice, track pad, etc.), keyboards, and the like.

Bus 212 allows processor(s) 202, memory device(s) 204, interfaces) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
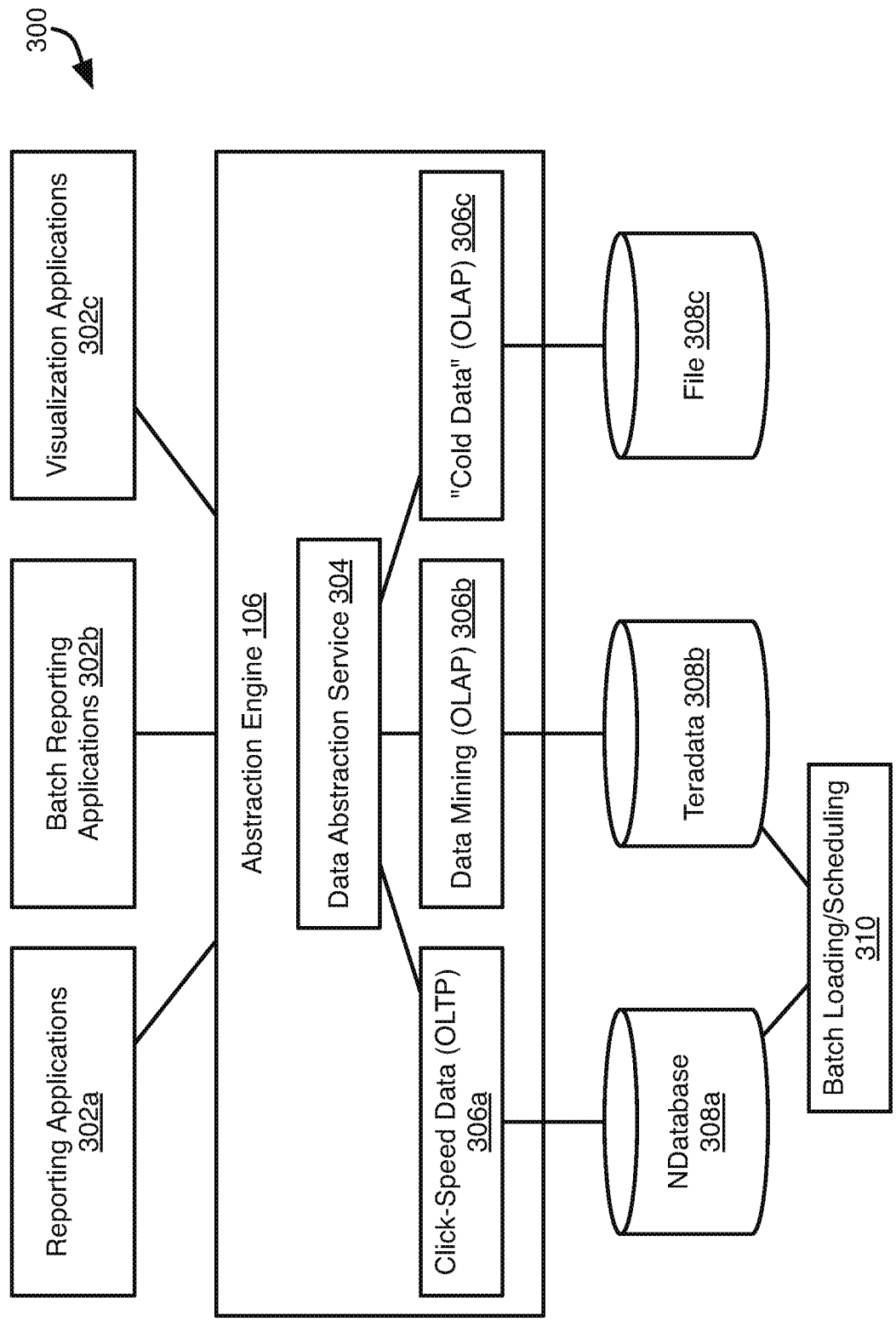
FIG. 3 is schematic block diagrams of software components of a system in accordance with an embodiment.

Referring to FIG. 3, the network environment 100 may implement and/or execute the illustrated software components. An application layer 300 may include various applications that consume data from one or more databases. The application layer 300 may be executed by the same server system 102a that executes the abstraction engine 106 or a different server system. Likewise, the application layer 300 may be executed by personal computers 110 in data communication with the server system 102a. The application layer 300 may include applications such as reporting applications 302a, batch reporting applications 302b, visualization applications 302c, or any other type of application for accessing and formatting data in a database.

Data requests from the application layer 300 may be input to the abstraction engine 106 and responses to request may be provided by the abstraction engine 106 to the application layer 300.

The abstraction engine may implement a data abstraction service 304 that translates requests and routes them to one or more modules 306a-306c programmed to access various types of databases. In particular, the data abstraction services 304 may translate requests into procedures executed by, or including calls to, the modules 306a-306c. Likewise, the data abstraction service 304 receives responses from the modules 306a-306c and translates them into a universal format, e.g. an object of known format, and returns the responses to the application layer 300.

In the illustrated embodiment, module 306a is programmed to access click-speed data in an OLTP (On-Line Transaction Processing) type database 308a. Module 306b is programmed to access an OLAP (On-Line Analytical Processing) type database 308b. Module 306c accesses cold data in an OLAP type database 308c.

Modules may be provided that access any type of data according to any database protocol known in the art. For example, database 308a may be an NDatabase from MICROSOFT, database 308b may be a TERADATA database, and database 308c may be a file server of any type known in the art. Other database protocols such as SQL, DB2, ORACLE, or the like, may also be implemented by the databases 308a-308c. A batch loading/scheduling module 310 may receive requests from the abstraction engine 106 and submit them to databases 308a-308b for execution.

Figure 4:
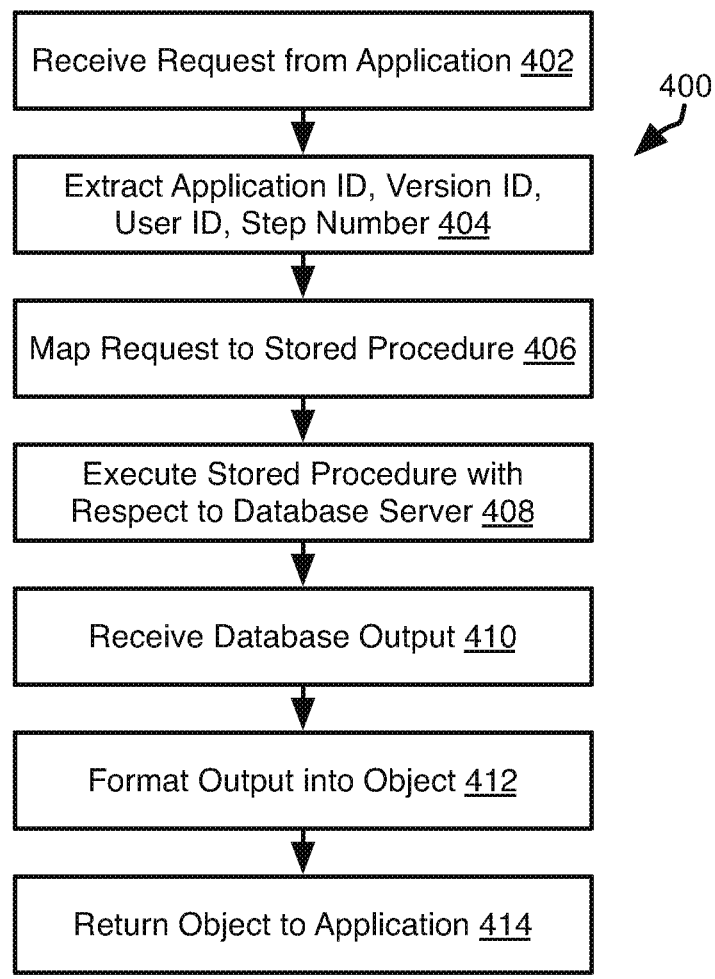
FIG. 4 is a process flow diagram of a method for executing database requests in accordance with an embodiment.

Referring to FIG. 4, the data abstraction service 304 may execute the illustrated method 400 in order to translate requests received from the application layer 300 into instructions formatted according to a database protocol of a database 308a-308c. The method 400 may be executed by the server system 102a.

The method 400 may include receiving 402 a request from an application. The request may include some or all of an application identifier (App ID), an application version identifier (Version ID), user identifier (User ID), and a logical identifier that references the data requested (Step Number). The logical identifier does not need to correspond to any particular canonical label of the database to which the request is directed and the request itself does not conform to any particular database protocol. In some embodiments, the logical identifier may be mapped to a value, such as a step number, that is included in a table mapping stored procedures to a combination of request attributes.

The method 400 then includes extracting 404 the attributes from the request (App ID, Version ID, User ID, Step Number). The method 400 then includes mapping 406 these values to a stored procedure. For example, the data abstraction service 304 may store or access a table that lists potential values for these attributes and maps one or more combinations of values to a stored procedure. The stored procedure may simply invoke retrieval of data form a corresponding database location or may perform more complex tasks such as a filtering function. In some embodiments, in addition to the attributes noted above, the request may include one or more filtering criteria that are then input to the stored procedure corresponding to the attributes of the request. A filtering request may further specify what portion of a data set to search or the portion to be searched may be determined from the logical identifier and programmed into the corresponding stored procedure mapped to the attributes of the request.

The method 400 may then include executing 408 the stored procedure. The stored procedure may be executed by the server system 102a or may be passed to a separate database server 102b. The stored procedure will be formatted and submitted in accordance to a particular database to which it is addressed. Accordingly, multiple stored procedures corresponding to different types of databases may be mapped to various combinations of request attributes, thereby enabling multiple types of databases to be accessed by the same application without requiring that the application be programmed to use multiple database protocols.

Executing 408 the stored procedure may include executing the procedure only upon authentication of a user. For example, the User ID field may be evaluated and the stored procedure is executed only if the User ID is determined to have access to the data referenced by the stored procedure.

The method 400 may further include receiving 410 a result of execution of the stored procedure. This may include a table of values representing a range of values requested, a result of a filtering operation, or any other type of database access request known in the art.

The output is then formatted 412 into an object. In particular, inasmuch as the application is abstracted from the specific database protocol, the data from multiple types of databases may all be transformed into a same format. For example, a table may include column and/or row labels such that each value in the table (unique column and row address) may have one or more labels associated therewith. Accordingly, each value may be mapped to one or more values and included in an object as a <key,value> pair, where "key" is a label from the original data table.

For example, a table may be formatted {<key1>[<key1.1, value1>,<key1.2, value2> . . . ]}. Where key1 is a column label, key1.1 and key1.2 are labels for rows, and value1 is the value at column key1 and row key1.1 and value2 is the value at column key1 and row key1.2.

The <key,value> pairs may be stored in an object and streamed or formatted directly into a stream of data returned 414 to the application that issued the request corresponding to the data. The object returned may be a JSON (JavaScript object notation) object, XML (extensible markup language) object, or any other type of data object.

The above-described approach provides many advantages. For example, if a database is moved from a first database according to a first protocol to a second database of a second protocol, the entry in the stored procedures map may be changed such that a given combination of request attributes will point to a procedure corresponding to the second protocol and second database rather than the first protocol and the first database. However, the format of the request does not need to change and no reprogramming of applications making requests is required.

Likewise, if the organization (e.g. ordering of columns or rows) of a database may be changed without requiring any modification of an application accessing the database. Inasmuch as data is transformed into <key,value> pairs, the actual ordering of the columns will not impact the intelligibility of the data, since each value will be labeled.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method comprising:
storing a data structure comprising a mapping between one or more combinations of request attributes and a plurality of stored procedures, each stored procedure including both an operation to be performed and a database location on which the operation is to be performed;
receiving, by a server system from an application, a request including a logical identifier, wherein the request is database-agnostic in not conforming to any particular database protocol;
extracting, by the server system, a user identifier from the request;

authenticating, by the server system, the user identifier with respect to the logical identifier;
extracting, by the server system, an application identifier and an application version identifier from the request;
accessing, by the server system, the data structure to determine a selected stored procedure of the plurality of stored procedures, the data structure further comprising a plurality of combinations of potential values for the one or more combinations of request attributes, each of the plurality of combinations being mapped to one of the plurality of stored procedures, the selected stored procedure being determined based on the one or more combinations of request attributes that correspond to one of the plurality of combinations of potential values for the application identifier, the application version identifier, and the logical identifier;
submitting, by the server system, to a batch loading module, a request to execute the selected stored procedure to obtain a result of the operation of the selected stored procedure;
executing, by the batch loading module, the selected stored procedure in response to authenticating the user identifier with respect to the logical identifier; and
returning, by the server system, the result to the application.

2. The method of claim 1, wherein the application is executing on a computer remote from the server system.

3. The method of claim 1, wherein the stored procedure performs no other function than to return a data table.

4. The method of claim 1, wherein the stored procedure performs a filtering function with respect to a data set and returns a filtered data set resulting from the filtering function.

5. The method of claim 1, wherein executing, by the server system, the procedure to obtain the result of the operation comprises:
executing native database operations with respect to a database server.

6. The method of claim 1, wherein the result of the operation is a data table including a plurality of entries; and
wherein returning, by the server system, the result of the operation to the application comprises:
transforming, by the server system, each entry of the plurality of entries into a key-value pair; and
returning, by the server system, the key-value pairs of the plurality of entries to the application.

7. The method of claim 6, wherein returning the key-value pairs to the application comprises packaging the key-value pairs into an object and returning the object to the application.

8. The method of claim 7, wherein the object is at least one of JAVASCRIPT object notation (JSON) object and an extensible markup language (XML) object.

9. A system comprising:
a plurality of databases operating according to a plurality of different database protocols;
one or more processing devices and one or more memory devices coupled to the one or more memory devices, the one or more memory devices storing executable code effective to cause the one or more processors to:
store a data structure comprising a mapping between one or more combinations of request attributes and a plurality of stored procedures, each stored procedure including both an operation to be performed and a database location on which the operation is to be performed;
receive, from an application, a request including a logical, wherein the request is database-agnostic in not conforming to any of the plurality of different database protocols;
extract a user identifier from the request;
authenticate the user identifier with respect to the logical identifier;
extract an application identifier and an application version identifier from the request
access the data structure to determine a selected stored procedure of the plurality of stored procedures, the data structure further comprising a plurality of combinations of potential values for the one or more combinations of request attributes, each of the plurality of combinations being mapped to one of the plurality of stored procedures, the selected stored procedure being determined based on the one or more combinations of request attributes that correspond to one of the plurality of combinations of potential values for the application identifier, the application version identifier, and the logical identifier;
submit a request to execute the selected stored procedure to obtain a result of the operation of the selected stored procedure to a batch loading module;
execute, by the batch loading module, the selected stored procedure in response to authenticating the user identifier with respect to the logical identifier, and with respect to a database of the plurality of databases including the database location and according to a database protocol of the plurality of database protocols corresponding to the database; and
return the result of the operation to the application.

10. The system of claim 9, wherein the application is executing on a computer remote from the system.

11. The system of claim 9, wherein the stored procedure is programmed to perform no other function then to return a data table.

12. The system of claim 9, wherein the stored procedure is programmed to perform a filtering function with respect to a data set and return a filtered data set resulting from the filtering function.

13. The system of claim 9, wherein the executable code is further effective to cause the one or more processors to execute the procedure to obtain the result of the operation by executing native database operations with respect to a database server.

14. The system of claim 9, wherein the result of the operation is a data table including a plurality of entries; and
wherein the executable code is further effective to cause the one or more processors to return the result of the operation to the application by:
transforming each entry of the plurality of entries into a key-value pair; and
returning the key-value pairs of the plurality of entries to the application.

15. The system of claim 14, wherein the executable code is further effective to cause the one or more processors to return the key-value pairs to the application by packaging the key-value pairs into an object and returning the object to the application.

16. The system of claim 15, wherein the object is at least one of JAVASCRIPT object notation (JSON) object and an extensible markup language (XML) object.

* * * * *